(12) United States Patent
Pan et al.

(10) Patent No.: US 10,975,273 B2
(45) Date of Patent: Apr. 13, 2021

(54) AQUEOUS POLYMER EMULSION AND AN AQUEOUS ADHESIVE COMPOSITION FORMED THEREFROM

(71) Applicants: Dow Global Technologies LLC, Midland, MI (US); Rohm and Haas Company, Collegeville, PA (US)

(72) Inventors: Yuanjia Pan, Shanghai (CN); Zhaohui Qu, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 0 days.

(21) Appl. No.: 15/767,004

(22) PCT Filed: Dec. 8, 2015

(86) PCT No.: PCT/CN2015/096614
§ 371 (c)(1),
(2) Date: Apr. 9, 2018

(87) PCT Pub. No.: WO2017/096514
PCT Pub. Date: Jun. 15, 2017

(65) Prior Publication Data
US 2018/0298247 A1    Oct. 18, 2018

(51) Int. Cl.
| | | |
|---|---|---|
| *C09J 131/04* | (2006.01) |
| *C08F 2/24* | (2006.01) |
| *C08F 218/08* | (2006.01) |
| *C08F 220/06* | (2006.01) |
| *C08F 220/10* | (2006.01) |
| *C08F 2/30* | (2006.01) |
| *C08F 2/26* | (2006.01) |
| *C09J 133/08* | (2006.01) |
| *C09J 133/10* | (2006.01) |
| *C09J 133/06* | (2006.01) |

(52) U.S. Cl.
CPC .............. *C09J 131/04* (2013.01); *C08F 2/24* (2013.01); *C08F 2/26* (2013.01); *C08F 2/30* (2013.01); *C08F 218/08* (2013.01); *C08F 220/06* (2013.01); *C08F 220/10* (2013.01); *C09J 133/06* (2013.01); *C09J 133/08* (2013.01); *C09J 133/10* (2013.01)

(58) Field of Classification Search
USPC ........................................ 524/814, 831, 833
See application file for complete search history.

(56) References Cited

U.S. PATENT DOCUMENTS

| | | | | |
|---|---|---|---|---|
| 3,365,410 A | * | 1/1968 | Wesslau ................. | C08L 31/04 |
| | | | | 524/521 |
| 5,037,700 A | | 8/1991 | Davis | |
| 5,201,948 A | | 4/1993 | Fasano et al. | |
| 6,201,062 B1 | | 3/2001 | Weitzel et al. | |
| 6,203,916 B1 | | 3/2001 | Eisenhart et al. | |
| 6,251,213 B1 | | 6/2001 | Bartman et al. | |
| 8,067,513 B2 | * | 11/2011 | Davis ...................... | C08K 5/06 |
| | | | | 526/193 |
| 2012/0121921 A1 | | 5/2012 | Cosyns et al. | |
| 2012/0130035 A1 | | 5/2012 | Schliwka et al. | |

FOREIGN PATENT DOCUMENTS

| | | |
|---|---|---|
| CN | 101585894 A | 11/2009 |
| CN | 102559104 A | 7/2012 |
| CN | 103059211 A | 4/2013 |
| CN | 103435736 A | 12/2013 |
| CN | 105086886 A | 11/2015 |
| WO | 2011009800 A1 | 1/2011 |
| WO | 2015/155157 A1 | 10/2015 |
| WO | 2015/155159 A1 | 10/2015 |
| WO | 2016/007313 A1 | 1/2016 |

OTHER PUBLICATIONS

Online translation of Detailed Description of CN 103059211 A; publication date: Apr. 2013 (Year: 2013).*
T. G. Fox, Bull. Am. Physics Soc., vol. 1, Issue 3, p. 123 (1956).
PCT/CN2015/096614, International Search Report and Written Opinion dated Aug. 17, 2016.

* cited by examiner

*Primary Examiner* — Fred M Teskin
(74) *Attorney, Agent, or Firm* — William Hales

(57) ABSTRACT

An aqueous polymer emulsion comprising: i) as polymerized units, from 20% to 80% by dry weight, based on total dry weight of the polymer, of vinyl acetate; ii) as polymerized units, from 20% to 80% by dry weight, based on total dry weight of the polymer, of an α, β-ethylenically unsaturated carboxylic ester monomer; iii) as polymerized units, from 0.1% to 5% by dry weight, based on total dry weight of the polymer, of a stabilizer monomer; iv) from 0.05% to 1% by dry weight, based on total dry weight of the polymer, of a surfactant, wherein said aqueous polymer emulsion has a viscosity of less than 100 cps. An aqueous adhesive composition comprising said aqueous polymer emulsion.

10 Claims, No Drawings

AQUEOUS POLYMER EMULSION AND AN AQUEOUS ADHESIVE COMPOSITION FORMED THEREFROM

FIELD OF THE INVENTION

The present invention relates to an aqueous polymer emulsion. The present invention also relates to an aqueous adhesive composition containing such aqueous polymer emulsion which is used in laminates, textile and non-woven fabrics.

INTRODUCTION

Aqueous vinyl acetate polymer emulsions are widely used as binders in the adhesive industry because they are relatively inexpensive compared to acrylic emulsions. Vinyl acetate has high water solubility, a high monomer-polymer swelling ratio, and a high chain transfer constant. However, the use of vinyl acetate monomers in adhesives may hurt the emulsion storage stability of polymer emulsions. Usually, this problem can be solved by increasing the amount of surfactants added or by adding protective colloids such as polyvinyl alcohol ("PVOH") and hydroxyethyl cellulose ("HEC") to the vinyl acetate polymer emulsions to provide required stability. However, adding high levels of surfactants is not economical and may have negative effect on emulsion water-sensitivity, which may cause foaming in the adhesives as well as deteriorating adhesive performance such as bond strength. The addition of protective colloid may also lead to high emulsion viscosity.

It is therefore desired to provide an aqueous vinyl acetate polymer emulsion with low viscosity and acceptable emulsion storage stability, and an aqueous adhesive composition containing such aqueous vinyl acetate polymer emulsion with acceptable adhesive performance, such as bond strength and heat seal strength.

SUMMARY OF THE INVENTION

The present invention provides a novel aqueous vinyl acetate polymer emulsion with low viscosity and acceptable emulsion storage stability, and an aqueous adhesive composition containing such aqueous vinyl acetate polymer emulsion with acceptable adhesive performance, such as bond strength and heat seal strength.

In a first aspect of the present invention there is provided an aqueous polymer emulsion comprising: i) as polymerized units, from 20% to 80% by dry weight, based on total dry weight of the polymer, of vinyl acetate; ii) as polymerized units, from 20% to 80% by dry weight, based on total dry weight of the polymer, of an α,β-ethylenically unsaturated carboxylic ester monomer; iii) as polymerized units, from 0.1% to 5% by dry weight, based on total dry weight of the polymer, of a stabilizer monomer; iv) from 0.05% to 1% by dry weight, based on total dry weight of the polymer, of a surfactant, wherein said aqueous polymer emulsion has a viscosity of less than 100 cps.

In a second aspect of the present invention there is provided an aqueous adhesive composition comprising the aqueous polymer emulsion.

DETAILED DESCRIPTION OF THE INVENTION

An aqueous polymer emulsion comprising, as polymerized units, from 20% to 80%, preferably from 30% to 55%, and more preferably from 35% to 50%, by dry weight, based on total dry weight of the polymer, of vinyl acetate.

The aqueous polymer emulsion further comprises, as polymerized units, from 20% to 80%, preferably from 45% to 70%, and more preferably from 50% to 65%, by dry weight, based on total dry weight of the polymer, of an α,β-ethylenically unsaturated carboxylic ester monomer.

Suitable examples of the α,β-ethylenically unsaturated carboxylic ester monomers include (meth)acrylic ester monomers, i.e., methacrylic ester or acrylic ester monomers such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, 2-hydroxybutyl acrylate, 2-hydroxyethyl methacrylate, and 2-hydroxypropyl methacrylate; itaconic ester monomers such as dimethyl itaconate, dibutyl itaconate; and maleic ester such as dioctyl maleate; Preferably, the α,β-ethylenically unsaturated carboxylic ester monomers are ethyl acrylate, methyl methacrylate, butyl acrylate, 2-ethylhexyl acrylate, and any combinations thereof. More preferably, the α,β-ethylenically unsaturated carboxylic ester monomer are butyl acrylate, 2-ethylhexyl acrylate, and any combinations thereof.

The aqueous polymer emulsion further comprises, as polymerized units, from 0.1% to 5%, preferably from 0.1% to 2.5%, and more preferably from 0.1% to 1.5% by dry weight, based on total dry weight of the polymer, of a stabilizer monomer.

Suitable examples of the stabilizer monomers include sodium styrene sulfonate, sodium vinyl sulfonate, 2-acrylamido-2-methylpropanesulfonic acid, acrylamide, acrylic acid, methacrylic acid, itaconic acid, and any combinations thereof.

The aqueous polymer emulsion may further comprise a vinyl ester monomer other than vinyl acetate. Suitable examples of the vinyl ester monomers include vinyl propionate, vinyl neononanoate, vinyl neodecanoate, vinyl 2-ethylhexanoate, vinyl pivalate, vinyl versatate and any combinations thereof.

The glass transition temperature ("Tg") of the aqueous polymer emulsion is from 8° C. to −43° C., preferably from −14° C. to −32° C., and more preferably from −23° C. to −30° C. Tgs herein are calculated using the Fox Equation (T. G. Fox, *Bull. Am. Physics Soc.*, Volume 1, Issue 3, page 123 (1956)).

The solids content of the aqueous polymer emulsion is from 30% to 60%. It is preferably from 35% to 50%, and more preferably from 41% to 45%.

The viscosity of the aqueous polymer emulsion is less than 100 cps, preferably less than 50 cps, and more preferably less than 30 cps, as measured by a Brookfield LVT Dial-Reading Viscometer (Spindle #2 at 60 rpm).

The particle size of the aqueous polymer emulsion is from 150 nm to 500 nm, and preferably from 250 nm to 350 nm.

Preferably, the aqueous polymer emulsion has a grit of less than 0.2%, preferably less than 0.02%, and more preferably less than 0.01% by weight, based on total weight of the polymer. The grit is determined by filtering 200 g of the aqueous polymer emulsion through a 325 mesh filter, and subsequently drying and weighing the dried grit.

The polymerization process used herein can be carried out using known method for preparing an aqueous emulsion polymer.

The aqueous polymer emulsion further comprises, as emulsifier, from 0.05% to 1%, preferably from 0.05% to 0.5%, and more preferably from 0.05% to 0.3% by dry weight, based on total dry weight of the polymer, a surfactant.

The surfactant is preferably a combination of anionic surfactant and non-ionic surfactant with a mole ratio of the ionic surfactant to that of the non-ionic surfactant being 0.5 to 20, preferably being 1 to 10, and more preferably being 2 to 5.

Suitable examples of the anionic surfactants include sulfates, sulfonates, phosphates, carboxylates, and any combinations thereof. Preferably, the anionic surfactant is sulfonate such as sodium dodecyl benzene sulfonate, sodium dodecyl sulfonate, sodium dodecyl diphenyl oxide disulfonate, sodium n-decyl diphenyl oxide disulfonate, isopropylamine dodecylbenzenesulfonate, and sodium hexyl diphenyl oxide disulfonate. More preferably, the anionic surfactant is sodium dodecyl benzene sulfonate.

Suitable examples of non-ionic surfactants include polyoxyethylenated alkylphenols, polyoxyethylenated alcohols, ethylene oxide-propylene oxide block copolymers, polyoxyethylenated fatty acid esters. Preferably, the non-ionic surfactant is polyoxyethylenated alcohols with general molecule as RO—$(CH_2CH_2O)_n$H, wherein R is alkyl group. More preferably, alkyl group R is $C_{12}$-$C_{18}$ and oxyethylene group —$(CH_2CH_2O)$— is greater than 20. Commercially available non-ionic surfactant includes TERGITOL™ 15-S-40 from The Dow Chemical Company.

Preferably, protective colloid is excluded from the aqueous polymer emulsion of the present invention. Protective colloid can be (1) natural or modified-natural products such as gum agar, gum arabic, gum tragacanth, water soluble starch, pectin, gelatin, and aliginate, and modified cellulose such as hydroxylethyl cellulose and carboxymethyl cellulose; or (2) synthetic products such as polyvinyl alcohol with a hydrolysis degree of from 70 to 100 mol %.

An aqueous adhesive composition comprising said aqueous polymer emulsion is prepared by techniques which are well known in the adhesives art. Optionally, such adhesive composition may comprise additional water, latex binder, crosslinker, and additives such as rheology modifiers, biocides, wetting and defoaming agents. Preferably, the aqueous adhesive composition excludes further addition of any surfactants during the preparation of the aqueous adhesive composition.

The aqueous adhesive composition is applied onto the surface of ordinary substrates such as biaxially oriented polypropylene film, polyester film, nylon film, and dried to form a dry layer. The applied adhesive composition is considered to be dry when the remainder of water is less than 10% of the applied adhesive composition.

The surface of a vacuum metallized casted polypropylene film, casted polypropylene film or polyethylene film is covered on the dry layer of applied adhesive composition so that a biaxially oriented polypropylene film/adhesive/vacuum metallized casted polypropylene film composite (composite films, and also known as the laminate) is formed. The laminate is preferably subjected to mechanical force to press the films even more closely. Such mechanical force is preferably applied by passing the laminate between rollers. Preferably, the rollers are heated.

In the present disclosure, the technical features in each preferred technical solution and more preferred technical solution can be combined with each other to form new technical solutions unless indicated otherwise. For briefness, the specification omits the descriptions for these combinations. However, all the technical solutions obtained by combining these technical features should be deemed as being literally described in the present specification in an explicit manner.

| Abbreviations: | |
|---|---|
| Acrylic acid | AA |
| Ammonia persulfate | APS |
| Butyl acrylate | BA |
| Biaxially oriented polypropylene | BOPP |
| Deionized water | DI water |
| Isoascorbic acid | IAA |
| Methacrylic acid | MAA |
| Sodium bisulfite | SBS |
| Sodium persulfate | SPS |
| Sodium vinyl sulfonate | SVS |
| tert-butyl hydroperoxide | t-BHP |
| Vinyl acetate | VA |
| Vacuum metallized casted polypropylene | VMCPP |

EXAMPLES

I. Raw Materials

| Materials | Descriptions | Available from |
|---|---|---|
| AIRVOL 205 ("PVOH A") | a partially hydrolyzed (87-89 mol %) PVOH | Air Products |
| CELLOSIZE ™ QP 3L ("HEC A") | a low molecule weight HEC | The Dow Chemical Company |
| KATHON ™ LX | a biocide | The Dow Chemical Company |
| ROBOND ™ Binder L-70D | a waterborne acrylic adhesive with 42% solid | The Dow Chemical Company |
| ROVACE ™ Binder 662 | a waterborne vinyl acrylic copolymer emulsion comprising HEC as protective colloid | The Dow Chemical Company |
| RHODACAL ™ DS-4 surfactant ("DS-4") | an anionic surfactant with 23% solid content | Rhodia Company |
| TERGITOL ™ 15-S-40 surfactant ("15-S-40") | a non-ionic surfactant with 70% active | The Dow Chemical Company |
| VINALYST 3525 ("V3525") | SVS with 25% active | The Dharamsi Morarji Chemical Co. Ltd. |

II. Test Methods

1. Emulsion Storage Stability (Stability)

The pH value, solid content, viscosity and grit of the fresh polymer emulsion samples were recorded. Then, each of the fresh polymer emulsion samples was poured into a 250 ml glass bottle leaving no free space on the top of the emulsion surface. Bottles were then sealed up appropriately with additional tape around the cover. The sealed bottles were put in a 50° C. oven and aged for a period of time, then taken out and cooled down in room temperature. The pH value, solid content (top & bottom), and viscosity of aged polymer emulsion samples were measured again, and they were further observed for gel, grit or separation. The time aged in the oven was also recorded.

2. Bond Strength

Laminates prepared from adhesive compositions were cut into 15 mm width strips for T-peel test under 250 mm/min crosshead speed using a 5940 Series Single Column Table Top System available from Instron Corporation. During the test, the tail of each strip was pulled slightly by fingers to make sure the tail remained 90 degree to the peeling direction. Three strips for each sample were tested and the average value was calculated. Results were in the unit of N/15 mm. The higher the value is, the better the bond strength is.

3. Heat Seal Strength

Laminates prepared from adhesive compositions were heat-sealed in a HSG-C Heat-Sealing Machine available from Brugger Company under 140° C. seal temperature and 300N pressure for 1 second, then cooled down and cut into 15 mm width strips for heat seal strength test under 250 mm/min crosshead speed using a 5940 Series Single Column Table Top System available from Instron Corporation. Three strips for each sample were tested and the average value was calculated. Results were in the unit of N/15 mm. The higher the value is, the better the heat seal strength is.

III. Examples

1. Preparation of Aqueous Polymer Emulsions

Inventive Examples 1

Monomer Emulsion Preparation: An emulsified monomer mixture was prepared by adding 435.0 g of DI water, 9.6 g of DS-4, 11.5 g of V3525, 854.5 g of BA, 36.0 g of AA and 548.0 g of VA slowly to the agitated solution before polymerization.

Polymerization: A solution containing 0.9 g of sodium bicarbonate and 730.0 g of DI water were placed in a 5-necked, 5-liter round bottom flask equipped with a thermocouple, a cooling condenser and an agitator, and heated to 74° C. under nitrogen. 0.01 g $FeSO_4$, 0.01 g EDTA tetrasodium salt, 3.2 g of APS and 28.7 g of perform seed in 51.0 g of DI water were charged into the flask. When the temperature was at 74° C., monomer mixture and a co-feed solution of 3.2 g of APS solved in 148.0 g DI water and 0.7 g of IAA solved in 148.0 g DI water were fed in 210 minutes. The polymerization reaction temperature was maintained at 73-75° C. Upon completion of the additions, the reaction mixture was cooled to 70° C. before gradual addition of a solution of 3.0 g t-BHP (70% active content) in 28.2 g DI water and 2.3 g SBS solved in 28.2 g DI water in 45 minutes with stirring. Upon completion of the feeds, the reaction was cooled to room temperature. 6.8 g $Na_2CO_3$ in 78.2 g DI water was then drop added in 30 minutes to adjust pH value to 6.0-8.0. Then, 0.11 g of KATHON™ LX biocide was added with stirring in 30 minutes. Proper amount of DI water was added to adjust final solids to 42-45%.

Inventive Examples 2-8

Polymer emulsions were prepared by using the procedure outlined for Inventive Example 1. The weights for the monomer emulsions are detailed in Table 1.

TABLE 1

| Monomer Emulsion | DI water | Surfactant | Stabilizer monomer | Vinyl acetate | α,β-ethylenically unsaturated carboxylic ester monomer |
|---|---|---|---|---|---|
| Inventive Example 1 | 435.0 g | 9.6 g DS-4 | 11.5 g V3525; 36.0 g AA | 548.0 g | 854.5 g BA |
| Inventive Example 2 | 435.0 g | 9.6 DS-4 | 11.5 g V3535; 14.4 g AA | 562.4 g | 861.7 g BA |
| Inventive Example 3 | 435.0 g | 9.6 g DS-4; 0.9 g 15-S-40 | 11.5 g V3535; 7.2 g AA | 656.1 g | 775.5 g BA |
| Inventive Example 4 | 435.0 g | 9.6 g DS-4; 0.45 g 15-S-40 | 11.5 g V3535; 14.4 g AA | 562.4 g | 861.7 g BA |
| Inventive Example 5 | 435.0 g | 9.6 g DS-4; 0.9 g 15-S-40 | 11.5 g V3535; 14.4 g AA | 540.8 g | 883.2 g BA |
| Inventive Example 6 | 435.0 g | 9.6 g DS-4; 0.9 g 15-S-40 | 11.5 g V3535; 14.4 g MAA | 540.8 g | 883.2 g BA |
| Inventive Example 7 | 435.0 g | 9.6 g DS-4; 0.9 g 15-S-40 | 11.5 g V3535; 14.4 g AA | 274.0 g | 1148.9 g BA |
| Inventive Example 8 | 435.0 g | 9.6 g DS-4; 0.9 g 15-S-40 | 11.5 g V3535; 14.4 g AA | 1139.3 g | 287.2 g BA |

Comparative Example 1

Monomer Emulsion Preparation: An emulsified mixture was prepared by adding 435.0 g of DI water, 9.6 g of DS-4, 0.9 g of 15-S-40, 11.5 g of V3535, 883.1 g of BA, 14.4 g of AA and 540.8 g of VA slowly to the agitated solution before polymerization.

Polymerization: A solution containing 0.9 g of sodium bicarbonate and 587.3 g of DI water were placed in a 5-necked, 5 liter round bottom flask equipped with a thermocouple, a cooling condenser and an agitator, and heated to 74° C. under nitrogen. Charge 7.18 g HEC A dispersed in 143.6 g hot water. Charge 0.01 g $FeSO_4$, 0.01 g EDTA tetrasodium salt, 3.2 g of APS and 28.7 g of perform seed in 51.0 g of DI Water into the kettle. When the temperature was at 74° C., monomer emulsion and a co-feed solution of 3.2 g of APS solved in 148.0 g of DI water and 0.7 g of IAA solved in 148.0 g of DI water were fed in 210 minutes. The polymerization reaction temperature was maintained at 73-75° C. Upon completion of the additions the reaction mixture was cooled to 70° C. before gradual addition of solution of 3.0 g t-BHP (70% active content) in 28.2 g DI water and 2.3 g SBS solved in 28.2 g DI water in 45 minutes with stirring. Upon completion of the feeds, the reaction was cooled to room temperature. Add 6.8 g $Na_2CO_3$ in 78.2 g water solution drop adding in 30 minutes to adjust pH value to 6.0~8.0. Then add 0.11 g of KATHON™ LX biocide with stirring 30 minutes. Add proper amount of DI water to adjust final solids to 42-45%.

Comparative Example 2

Monomer Emulsion Preparation: An emulsified monomer mixture was prepared by adding 435.0 g of DI water, 9.6 g of DS-4, 0.9 g of 15-S-40, 11.5 g of V3535, 883.1 g of BA, 14.4 g of AA and 540.8 g of VA slowly to the agitated solution before polymerization.

Polymerization: A solution containing 0.9 g of sodium bicarbonate and 605.0 g of DI water were placed in a 5-necked, 5 liter round bottom flask equipped with a thermocouple, a cooling condenser and an agitator, and heated to 74° C. under nitrogen. Charge 14.6 g PVOH A dispersed in 125.0 g hot water. Charge 0.01 g $FeSO_4$, 0.01 g EDTA tetrasodium salt, 3.2 g of APS and 28.7 g of perform seed in 51.0 g of DI Water into the kettle. When the temperature was at 74° C., monomer emulsion and a co-feed solution of 3.2 g of APS solved in 148.0 g of DI water and 0.7 g of IAA solved in 148.0 g of DI water were fed in 210 minutes. The polymerization reaction temperature was maintained at 73-75° C. Upon completion of the additions the reaction mixture was cooled to 70° C. before gradual addition of solution of 3.0 g t-BHP (70% active content) in 28.2 g DI water and 2.3 g SBS solved in 28.2 g DI in 45 minutes with stirring. Upon completion of the feeds, the reaction was cooled to room temperature. Add 6.8 g $Na_2CO_3$ in 78.2 g water solution drop adding in 30 minutes to adjust pH value to 6.0~8.0. Then add 0.11 g of KATHON™ LX biocide with stirring 30 minutes. Add proper amount of DI water to adjust final solids to 42-45%.

Comparative Example 3

Monomer Emulsion Preparation: An emulsified monomer mixture was prepared by adding 435.0 g of DI water, 51.2 g of DS-4, 15.8 g of 15-S-40, 11.5 g of V3535, 789.8 g of BA, 14.4 g of AA and 634.5 g of VA slowly to the agitated solution before polymerization.

Polymerization: A solution containing 0.9 g of sodium bicarbonate and 730.0 g of DI water were placed in a 5-necked, 5 liter round bottom flask equipped with a thermocouple, a cooling condenser and an agitator, and heated to 74° C. under nitrogen. Charge 0.01 g $FeSO_4$, 0.01 g EDTA tetrasodium salt, 3.2 g of APS and 28.7 g of perform seed in 51.0 g of DI Water into the kettle. When the temperature was at 74° C., monomer emulsion and a co-feed solution of 3.2 g of APS solved in 148.0 g of DI water and 0.7 g of IAA solved in 148.0 g of DI water were fed in 210 minutes. The polymerization reaction temperature was maintained at 73-75° C. Upon completion of the additions the reaction mixture was cooled to 70° C. before gradual addition of solution of 3.0 g t-BHP (70% active content) in 28.2 g DI water and 2.3 g SBS solved in 28.2 g DI water in 45 minutes with stirring. Upon completion of the feeds, the reaction was cooled to room temperature. Add 6.8 g $Na_2CO_3$ in 78.2 g water solution drop adding in 30 minutes to adjust pH value to 6.0~8.0. Then add 0.11 g of KATHON™ LX biocide with stirring 30 minutes. Add proper amount of DI water to adjust final solids to 42-45%.

The weight percent of the surfactant, protective colloid, stabilizer monomer, vinyl acetate and α,β-ethylenically unsaturated carboxylic ester monomer in Inventive Examples 1 to 8 and Comparative Examples 1 to 3 are detailed in Table 2.

TABLE 2

| Aqueous Polymer Emulsion | Surfactant* | Protective colloid* | Stabilizer monomer** | Vinyl acetate** | α, β-ethylenically unsaturated carboxylic ester monomer** |
|---|---|---|---|---|---|
| Inventive Example 1 | 0.15% DS-4 | 0 | 0.2% V3525; 2.5% AA | 38% | 59.3% BA |
| Inventive Example 2 | 0.15% DS-4 | 0 | 0.2% V3525; 1% AA | 39% | 59.8% BA |
| Inventive Example 3 | 0.15% DS-4; 0.04% S-15-40 | 0 | 0.2% V3525; 0.5% AA | 45.5% | 53.8% BA |
| Inventive Example 4 | 0.15% DS-4; 0.02% S-15-40 | 0 | 0.2% V3525; 1% AA | 39% | 59.8% BA |
| Inventive Example 5 | 0.15% DS-4; 0.04% S-15-40 | 0 | 0.2% V3525; 1% AA | 37.5% | 61.3% BA |
| Inventive Example 6 | 0.15% DS-4; 0.04% S-15-40 | 0 | 0.2% V3525; 1% MAA | 37.5% | 61.3% BA |

TABLE 2-continued

| Aqueous Polymer Emulsion | Surfactant* | Protective colloid* | Stabilizer monomer** | Vinyl acetate** | α, β-ethylenically unsaturated carboxylic ester monomer** |
|---|---|---|---|---|---|
| Inventive Example 7 | 0.15% DS-4; 0.04% S-15-40 | 0 | 0.2% V3525; 1% AA | 19% | 79.8% BA |
| Inventive Example 8 | 0.15% DS-4; 0.04% S-15-40 | 0 | 0.2% V3525; 1% AA | 78.9% | 19.9% BA |
| Comparative Example 1 | 0.15% DS-4; 0.04% S-15-40 | 0.5% HEC A | 0.2% V3525; 1% AA | 37.5% | 61.3% BA |
| Comparative Example 2 | 0.15% DS-4; 0.04% S-15-40 | 1% PVOH A | 0.2% V3525; 1% AA | 37.5% | 61.3% BA |
| Comparative Example 3 | 0.80% DS-4; 0.70% S-15-40 | 0 | 0.2% V3525; 1% AA | 44% | 54.8% BA |

*by dry weight, based on total dry weight of the polymer
**as polymerized units, by dry weight, based on total dry weight of the polymer 2. Preparation of Aqueous Adhesive Compositions The above aqueous polymer emulsions are used as aqueous adhesive compositions without further formulations.

3. Preparation for Laminates

BOPP and VMCPP films were used without any pretreatment. The adhesive was coated on BOPP, dried and combined with VMCPP films to obtain BOPP/adhesive/VMCPP film composite with adhesive coating weight of 1.8 g/m² on dry weight basis. Then the combined BOPP/adhesive/VMCPP film composite was curing on 50° C. for 1 day.

IV. Application Performance Test Results

As Table 3 illustrates, all aqueous polymer emulsions of Inventive Examples 1 to 8 meet performance requirement, and exhibit good emulsion storage stability (greater than 1 month) and low viscosity (less than 100 cps). Both aqueous polymer emulsions of Comparative Example 1 and Comparative Example 2, which use HEC or PVOH respectively as protective colloid, exhibit high viscosity (greater than 300 cps) and poor emulsion storage stability (grit greater than 1%). Although Comparative Example 4 (Rovace™ Binder 662) exhibits good emulsion storage stability, the viscosity (greater than 300 cps) is higher than the desired performance requirement of less than 100 cps, due to the high surfactant level and added protective colloid.

TABLE 3

| Aqueous Polymer Emulsion | Surfactant* | Protective colloid* | Emulsion Storage Stability | Viscosity (cps) | Tg (° C.)** |
|---|---|---|---|---|---|
| Inventive Example 1 | 0.15% DS-4 | 0 | >1 month (grit < 0.2%) | 15-20 | −27° C. |
| Inventive Example 2 | 0.15% DS-4 | 0 | >3 months (grit < 0.2%) | 15-20 | −28° C. |
| Inventive Example 3 | 0.15% DS-4; 0.04% S-15-40 | 0 | >5 months (grit < 0.2%) | 15-20 | −23° C. |
| Inventive Example 4 | 0.15% DS-4; 0.02% S-15-40 | 0 | >3 months (grit < 0.2%) | 15-20 | −28° C. |
| Inventive Example 5 | 0.15% DS-4; 0.04% S-15-40 | 0 | >5 months (grit < 0.2%) | 15-20 | −29° C. |
| Inventive Example 6 | 0.15% DS-4; 0.04% S-15-40 | 0 | >5 months (grit < 0.2%) | 15-20 | −28.7° C. |
| Inventive Example 7 | 0.15% DS-4; 0.04% S-15-40 | 0 | >3 months (grit < 0.2%) | 15-20 | −43° C. |
| Inventive Example 8 | 0.15% DS-4; 0.04% S-15-40 | 0 | >3 months (grit < 0.2%) | 15-20 | 8° C. |
| Comparative Example 1 | 0.15% DS-4; 0.04% S-15-40 | 0.5% HEC A | grit > 1% | >300 | −29° C. |
| Comparative Example 2 | 0.15% DS-4; 0.04% S-15-40 | 1% PHOV A | grit > 1% | >300 | −29° C. |
| Comparative Example 4: Rovace ™ 662 | N/A | N/A | >3 months (grit < 0.2%) | >300 | N/A |

*By dry weight, based on total dry weight of the polymer
**Tgs herein are calculated using the Fox Equation (T. G. Fox, *Bull. Am. Physics Soc.*, Volume 1, Issue 3, page 123 (1956)).

As Table 4 illustrates, laminates prepared from the aqueous adhesive composition comprising aqueous polymer emulsions of Inventive Examples 3 to 5 exhibit good bond strength (greater than 1.0N/15 nm) and heat seal strength (greater than 10N/15 nm) adhesive performances. Especially, Inventive Example 5 shows optimized performance comparable to Comparative Example 5 (Robond™ Binder L-70D prepared from styrene-acrylic emulsion) which is used as a benchmark for performance goals. Although aqueous polymer emulsion of Comparative Example 3 exhibits good stability and low viscosity, the bond strength (less than 0.5N/nm) of the laminate prepared from the aqueous adhesive composition comprising aqueous polymer emulsion of Comparative Example 3 is much lower than Inventive Example 3 to 5 due to the high surfactant level.

TABLE 4

| Laminates | Surfactant* | Protective colloid* | Bond Strength (N/15 nm) | Heat Seal Strength (N/15 nm) |
|---|---|---|---|---|
| Inventive Example 3 | 0.15% DS-4; 0.04% S-15-40 | 0 | 1.1 | 14.6 |
| Inventive Example 4 | 0.15% DS-4; 0.02% S-15-40 | 0 | 1.27 | 15 |
| Inventive Example 5 | 0.15% DS-4; 0.04% S-15-40 | 0 | 1.5 | 15.6 |
| Comparative Example 3 | 0.80% DS-4; 0.70% S-15-40 | 0 | <0.5 | N/A |
| Comparative Example 5: ROBOND ™ L-70D | N/A | N/A | 1.54 | 15 |

What is claimed is:

1. An aqueous polymer emulsion comprising:
   i) as polymerized units, from 20% to 80% by dry weight, based on total dry weight of the polymer, of vinyl acetate;
   ii) as polymerized units, from 20% to 80% by dry weight, based on total dry weight of the polymer, of an α,β-ethylenically unsaturated carboxylic ester monomer;
   iii) as polymerized units, from 0.1% to 5% by dry weight, based on total dry weight of the polymer, of a stabilizer monomer selected from the group consisting of sodium styrene sulfonate, sodium vinyl sulfonate, 2-acrylamido-2-methylpropanesulfonic acid, acrylamide, acrylic acid, methacrylic acid, itaconic acid, and any combinations thereof;
   iv) from 0.05% to 1% by dry weight, based on total dry weight of the polymer, of a surfactant,
   where said aqueous polymer emulsion further comprises a vinyl ester monomer other than vinyl acetate,
   where said aqueous polymer emulsion has a viscosity of less than 100 cps.

2. The aqueous polymer emulsion according to claim 1, wherein said aqueous polymer emulsion has a viscosity of less than 30 cps.

3. The aqueous polymer emulsion according to claim 1, wherein said aqueous polymer emulsion comprising, from 0.05% to 0.5% by dry weight, based on total dry weight of the polymer, of a surfactant.

4. The aqueous polymer emulsion according to claim 1, wherein said surfactant is a combination of an anionic surfactant and a non-ionic surfactant with a mole ratio of the ionic surfactant to that of the non-ionic surfactant being 0.5-20.

5. The aqueous polymer emulsion according to claim 1, wherein said aqueous polymer emulsion does not comprise a protective colloid.

6. The aqueous polymer emulsion according to claim 1, wherein said aqueous polymer emulsion has a glass transition temperature of 8° C. to −43° C.

7. The aqueous polymer emulsion according to claim 1, wherein said aqueous polymer emulsion has a glass transition temperature of −23° C. to −30° C.

8. The aqueous polymer emulsion according to claim 1, wherein said aqueous polymer emulsion has a particle size from 150 nm to 500 nm.

9. The aqueous polymer emulsion according to claim 1, wherein said α,β-ethylenically unsaturated carboxylic ester monomer is (meth)acrylic ester monomer.

10. An aqueous adhesive composition comprising the aqueous polymer emulsion according to claim 1.

* * * * *